United States Patent
Itoh et al.

(10) Patent No.: US 8,006,829 B2
(45) Date of Patent: Aug. 30, 2011

(54) MOTORIZED ROLLER AND MOTOR UNIT FOR MOTORIZED ROLLER

(75) Inventors: Kazuo Itoh, Kasai (JP); Masaki Tanaka, Himeji (JP); Takenobu Nakashima, Kakogawa (JP); Tatsuhiko Nakamura, Hyogo (JP)

(73) Assignee: Itoh Denki Co., Ltd. (JP)

( * ) Notice: Subject to any disclaimer, the term of this patent is extended or adjusted under 35 U.S.C. 154(b) by 19 days.

(21) Appl. No.: 12/584,325

(22) Filed: Sep. 3, 2009

(65) Prior Publication Data

US 2010/0059341 A1 Mar. 11, 2010

(30) Foreign Application Priority Data

Sep. 7, 2008 (JP) ................................. 2008-229167
Jan. 9, 2009 (JP) ................................. 2009-003946

(51) Int. Cl.
*B65G 13/06* (2006.01)
*H01R 13/622* (2006.01)

(52) U.S. Cl. ............................ 198/788; 310/71; 439/299
(58) Field of Classification Search .................. 198/788; 310/67 R, 71; 439/296, 297, 299
See application file for complete search history.

(56) References Cited

U.S. PATENT DOCUMENTS

| | | | | |
|---|---|---|---|---|
| 1,889,173 A * | 11/1932 | Drexler | ........................ | 198/788 |
| 2,997,608 A * | 8/1961 | Musser | ....................... | 310/67 R |
| 3,892,144 A | 7/1975 | Kirkegaard | | |
| 4,322,121 A * | 3/1982 | Riches et al. | ................. | 439/312 |
| 4,605,274 A * | 8/1986 | Ichikawa | ....................... | 439/277 |
| 4,738,628 A * | 4/1988 | Rees | ............................ | 439/95 |
| 4,802,861 A * | 2/1989 | Gaston | .......................... | 439/247 |
| 4,846,714 A * | 7/1989 | Welsby et al. | ................. | 439/348 |
| 5,113,101 A * | 5/1992 | Liu et al. | .......................... | 310/87 |
| 5,413,209 A * | 5/1995 | Werner | ......................... | 198/500 |
| 5,442,248 A | 8/1995 | Agnoff | | |
| 6,672,449 B2 | 1/2004 | Nakamura et al. | | |
| 7,318,578 B2 * | 1/2008 | Hvidberg et al. | ............. | 254/266 |
| 2004/0020750 A1 * | 2/2004 | Kanaris | ......................... | 198/788 |
| 2005/0087428 A1 * | 4/2005 | Pelak et al. | ..................... | 198/780 |
| 2005/0109585 A1 | 5/2005 | Kanaris | | |
| 2009/0166157 A1 * | 7/2009 | Kratz et al. | .................... | 198/788 |

FOREIGN PATENT DOCUMENTS

| | | |
|---|---|---|
| JP | 63-133515 U1 | 1/1988 |
| JP | 63-133516 U1 | 1/1988 |
| JP | 2002-145438 A | 5/2002 |
| JP | 2004-018184 A | 1/2004 |
| JP | 2005-067811 A | 3/2005 |
| JP | 2007-528832 | 10/2007 |
| JP | 2008-140744 | 6/2008 |
| JP | 2008-204828 | 9/2008 |
| WO | WO 2005/090208 | 9/2005 |

\* cited by examiner

*Primary Examiner* — Mark A Deuble
(74) *Attorney, Agent, or Firm* — Wood, Phillips, Katz, Clark & Mortimer

(57) ABSTRACT

A motorized roller includes a roller body of a cylindrical shape, in which a motor and a reducer are housed. The motorized roller has fixed shafts protruding out of both ends of the roller body. A first fixed shaft has a cavity, in which a first connector is housed. A second connector is connected to the first connector. The first fixed shaft has a first engaging part (inside screw) for preventing disengagement of the second connector, so that a part (screw forming part) of the second connector is engaged with the first engaging part.

20 Claims, 18 Drawing Sheets

MOTORIZED ROLLER AND MOTOR UNIT FOR MOTORIZED ROLLER

BACKGROUND OF THE INVENTION

1. Field of the Invention

The present invention relates to an improvement of a motorized roller incorporating a motor in a roller body and further to a motor unit constituting such a motorized roller.

2. Description of the Related Art

A motorized roller is known as a component of a roller conveyor. A motorized roller, as disclosed in a patent document 1, incorporates a motor and a reducer in a roller body. Driving of the motor rotates the roller body.

FIG. 24 is a cross section of a motorized roller disclosed in the patent document 1.

A motorized roller 100 in the art includes a roller body 101 penetrated is by a fixed shaft 110. The roller body 101 has both ends each provided with a lid 102, and the shaft 110 has both ends 105 and 106 protruding out of the lids 102 respectively. The end 105 is of a hollow shape with an electric cable 107 inserted therein. Power is fed to a motor 103 incorporated in the body 101 via the electric cable 107.

There is also another configuration having a connector 111 provided at a distal end of the electric cable 107 so as to simplify electric wiring. The above-mentioned patent document 1 discloses such a configuration in which the connector 111 is provided at the distal end of the electric cable 107.

Though the connector 111 is provided at the distal end of the electric cable 107 in the patent document 1, patent documents 2 and 3 each discloses a modified motorized roller having still another configuration in which the above-mentioned connector is incorporated in the fixed shaft. According to the configuration disclosed in the patent documents 2 and 3, the connector is housed in a hollow part of the fixed shaft of the motorized roller and a separately prepared connector is connected to the fixed shaft so as to feed power and/or to send and receive signals.

Such a configuration in which a connector is housed in the fixed shaft is disclosed in more detail in a patent document 4.

Specifically, the motorized roller as defined in claim 1 in the patent document 4 is a motorized pulley or roller including a stationary roller shaft, a generally cylindrical drum mounted on the roller shaft for rotation around the axis of roller shaft, an electric drive assembly mounted on the roller shaft and disposed inside the cylindrical drum from rotating the drum about the roller shaft, a recess formed in one end of the roller shaft, a first electrical connector disposed in the recess in the end of the roller shaft and electrically connected to the electric drive assembly, and a second electrical connector operatively connected to a power source and shaped to mate with said first connector to provide power to said electric drive assembly when the first and second connectors are mated.

FIG. 25 is a cross section of the motorized roller disclosed in the patent document 4.

The motorized roller disclosed in the patent document 4 mainly consists of a roller body 120 penetrated by a fixed shaft 121 and a motor 122 functioning as an electric drive assembly and mounted on the shaft 121.

More specifically, in the motorized roller disclosed in the patent document 4, the fixed shaft 121 penetrates through the roller body 120. Further, a rotor 123 of the motor 122 is attached to and a stator 125 of the motor 122 is fixed to the fixed shaft 121.

In this way, in such the motorized roller as disclosed in the patent document 4, all members of the motor 122 functioning as the electric drive assembly are located around the shaft 121, so that "an electric drive assembly mounted on the roller shaft and disposed inside the cylindrical drum from rotating the drum about the roller shaft", which the claim recites, is realized.

Patent documents 5 and 6 each disclose a motor unit, which is combined with a roller body so as to constitute a motorized roller.

The motor unit disclosed in the patent documents 5 and 6 is an integral piece of a motor and a reducer, being inserted into a separately-prepared roller body so as to produce a motorized roller having a discretionary length. The motor unit mainly consists of a cylindrical casing having one end from which a short shaft protrudes and the other end provided with an output member.

The motor unit has the cylindrical casing with the short shaft integrally fixed to the one end of the casing. In the motor unit disclosed in the patent documents 5 and 6, the short shaft is a very short shaft and only fixed integrally to the casing, having an end at an open end of the casing. Therefore, the short shaft does not penetrate through the casing, not existing in the casing. In a hollow space within the casing, the motor and the reducer is incorporated. The reducer has an output shaft protruding from the other end of the casing and having the output member.

The motor unit disclosed in the patent documents 5 and 6 is inserted into the separate-prepared roller body so as to engage the output member with an inner face of the roller body.

The short shaft of the motor unit is supported at an open end of the roller body via a shaft bearing with a distal end of the shaft protruding from the roller body so as to serve as a fixed shaft at one end of the motorized roller.

Another short shaft is attached rotatably to the other end of the roller body, serving as a fixed shaft at the other end of the motorized roller.

In the motorized roller employing the motor unit in the patent documents 5 and 6, the fixed shaft does not penetrate through the roller body. The fixed shafts at the both ends of the motorized roller are short and only fixed to the both ends of the roller body.

More specifically, one of the shafts supports only the one end of the roller body and the one end of the casing of the motor unit. The other of the shafts supports only the other end of the roller body. Herein, in this motorized roller, an electric driving part is not held on the roller shaft, not meeting a condition in the patent document 4.

A patent document 7 discloses such a conveyor that the conveyor is divided into a plurality of zones, each of which has a sensor for detecting presence of an article to be conveyed, so that the conveyor drives a motorized roller under such a condition that an article exists in one zone and no article exists in a zone ahead of said zone. According to the conveyor disclosed in the patent document 7, the motorized roller is driven only when necessary. Therefore, the conveyor disclosed in the patent document 7 repeatedly makes the motorized roller start and stop at frequent intervals.

Patent Document 1: JP 2004-18184 A
Patent Document 2: JP 63-133515 U1
Patent Document 3: JP 63-133516 U1
Patent Document 4: U.S. Pat. No. 5,442,248 A
Patent Document 5: JP 2002-145438 A
Patent Document 6: U.S. Pat. No. 6,672,449 B2
Patent Document 7: JP 2005-67811 A

DISCLOSURE OF THE INVENTION

Problem to be Solved by the Invention

The present inventors have modified the motorized roller incorporating the motor unit as disclosed in the patent documents 5 and 6 described above and have produced experimentally one having such a configuration as housing a connector in one of fixed shaft ends.

Herein, the above-mentioned motorized roller disclosed in the patent documents 5 and 6 achieves such an advantageous effect as completing a motorized roller having high compatibility of its components and having a discretionary length as described above, since employing the motor unit.

In a motorized roller dispensing with a motor unit, as described in the patent documents 1, 2, 3, and 4, the fixed shaft penetrates through the roller body, resulting in changing a dimension of each part including a length of the fixed shaft depending on a total length of the roller body. That requires redesign of a length of each part and discrete production of components when a motorized roller having an irregular length is ordered in the case of employing a configuration in which a fixed shaft penetrates through a roller body.

In contrast, since the motorized roller employing the motor unit in the patent documents 5 and 6 is produced by insertion of the motor unit into the roller body, a length of the roller body has no limitation. That enables production of a motorized roller having a discretionary length.

Further, it is also possible to produce a motorized roller having a discretionary diameter by modifying a diameter of an output member.

Then, the present inventors improved the motorized roller employing the motor unit in the patent documents 5 and 6 and produced experimentally one having such a configuration as housing the connector in the short shaft. However, the experimentally-produced motorized roller had an unexpected problem.

Specifically, the experimentally-produced motorized rollers each included a first connector (also called "a fixed-side connector") housed in the short shaft of the motor unit and a second connector (also called "a free-side connector") connected to the first connector. While such motorized rollers incorporated in conveyors were in use, some of the second connectors were disengaged.

After reviewing its cause, the inventors found that the motorized roller employing the motor unit might cause a higher vibration of the fixed shaft than the motorized roller as disclosed in the patent document 1, 2, 3, or 4, in which the fixed shaft penetrates through the roller body, and that the second connector might be disengaged because of the vibration of the fixed shaft.

Referring to FIG. 26, a motorized roller 100 receives a rotational force A caused by conveyance and a vertical load B caused by gravity of an article that is being conveyed.

The fixed shaft ought to bear a reaction force C of the rotational force A. Herein, in the motorized roller in the patent document 2, 3, or 4, in which the fixed shaft penetrates through the roller body, the both ends of the fixed shaft evenly bear the above-mentioned reaction force C. In contrast, the reaction force C acts on only one of the fixed shafts in the motorized roller employing the motor unit. Thus, in the motorized roller employing the motor unit, a higher reaction force C acts on the fixed shaft to which the connector is attached.

Further, since the fixed shaft only supports the end of the casing of the motor unit and the motor and the reducer are housed in the casing, a transmission pathway of the reaction force C is long. Thus, a greater deal of energy is stored until the rotational force is firstly transmitted to the fixed shaft upon starting of the motor. More specifically, the reaction force C is transmitted to the fixed shaft via a number of components, which have small gaps therebetween. Thus, upon starting of the motor, each gap between the components is cleared to transmit a driving force to the respective adjacent component and further each gap between the component and a component engaging with the component is cleared to transmit the driving force to the respective adjacent component. Repetition of such a motion transmits the reaction force C to the fixed shaft. Consequently, motion energy of the components is stored until the rotational force is firstly transmitted to the fixed shaft upon starting of the motor, and then impulsively acting on one of the fixed shafts.

As shown in FIG. 27, the load B by gravity of an article that is being conveyed further causes the motorized roller 100 to deflect, leading to a fluctuation of the fixed shaft(s) up and bottom. The motorized roller employing the motor unit especially has a large deflection in whole and a large fluctuation of the fixed shaft. In the motorized roller disclosed in the patent document 1, 2, 3, or 4, both the casing and the fixed shaft bear the load B since the fixed shaft penetrates through the roller body or are connected in an axial direction. In contrast, since the motorized roller employing the motor unit has a cavity having no component in some area in an axial direction within the roller body, the load B acts on only the casing. Consequently, the motorized roller employing the motor unit has a large deflection and a large fluctuation of the fixed shaft.

Recently, as described in the patent document 7, a conveyor that drives a motorized roller only in necessary is increased. A motorized roller employed in such the conveyor is repeatedly stopped and driven at frequent intervals. Therefore, the fixed shaft ordinary fluctuates largely, resulting in disengagement of the second connector.

The present invention therefore aims to provide a motorized roller adapted to protect a connector from being easily disengaged and a motor unit for a motorized roller.

Means to Solve the Problem

In order to solve the problems and drawbacks described above, an aspect of the present invention provided herein is a motorized roller, including: a roller body having both ends; a plurality of fixed shafts protruding out of the both ends of the roller body; and a motor housed in the roller body, wherein rotation of the motor rotates the roller body around the fixed shafts, at least one of the fixed shafts having a cavity and having a first connector at an inside or a distal end of the fixed shaft so as to electrically conduct between inside and outside of the roller body by connection of a separately prepared second connector to the first connector, and one selected from the fixed shaft and the first connector having a first engaging part for preventing disengagement of the second connector, so that a part of the second connector is mechanically engaged with the first engaging part. Hereinafter the term "the fixed shafts" denotes a member or members protruding out of the both ends of the roller body so as to fix the motorized roller, and includes a unitary piece of the medially-continuous fixed shafts and the fixed shafts each being short and terminating medially.

Further, another aspect relating to the present invention is a motor unit for a motorized roller, being inserted into a roller body so as to constitute a motorized roller, wherein the motor unit includes: a cylindrical casing; a motor housed in the casing; a first shaft protruding out of a distal end of the casing; a first holder fixing a proximal end portion of the first shaft to a distal end portion of the casing; and a driving shaft protruding out of a proximal end of the casing, so that a rotational force of the motor is transmitted to the driving shaft, the first shaft being hollow, protruding out of the distal end of the casing with being held by the first holder, and having a first connector at an inside or a distal end of the first shaft, so as to electrically conduct between inside and outside of the roller body by connection of a separately prepared second connector to the first connector, and one selected from the fixed shaft and the first connector having a first engaging part for preventing disengagement of the second connector, so that a part of the second connector is mechanically engaged with the first engaging part.

The motorized roller and the motor unit in the present aspects has the first connector disposed at an inside or a distal end of the fixed shaft, so that only insertion of the fixed shaft of the motorized roller into an opening of a fixed frame connects the second connector to the first connector so as to feed power to the motor.

Further, the motorized roller in the present aspects includes the first engaging part for preventing disengagement of the second connector, a part of which is mechanically engaged with the first engaging part, so that the second connector avoids being disengaged even if the fixed shaft vibrates.

It is recommended that the motorized roller and the motor unit for a motorized roller includes the second connector, the first connector being arranged within the fixed shaft (or the first shaft), the first engaging part being formed on an inner surface of the fixed shaft (or the first shaft), and the second connector having a second engaging part at an outer periphery of the second connector, so that the second connector is attached to the fixed shaft (or the first shaft) by engagement of the first engaging part with the second engaging part.

The motorized roller in the present aspect, the first engaging part is formed on the inner surface of the fixed shaft. The first engaging part may use an inside screw or a projection, for example.

Meanwhile, the second engaging part is formed at the outer periphery of the second connector. The second engaging part may use an outside screw or a nail. Hereinafter the term "a nail" includes a prong, a pawl, and a detent.

The motorized roller in the present aspect, the second connector is fixed to the fixed shaft by engagement of the first engaging part and the second engaging part, so that the electrically-connected connectors avoid unwanted disengagement.

Further, the motorized roller in the present aspect can use the second connector having a small size since having such a configuration in which the second engaging part formed at the outer periphery of the second connector and the first engaging part formed on the inner surface of the fixed shaft are engaged with each other. Therefore, for example, it is possible to house the end of the fixed shaft of the motorized roller in the inside of frame members making up the frame and to insert the second connector into an opening of the frame from outside of the frame so as to connect the both connectors.

The second connector preferably has a main body and an engaging tube formed around the main body, so that the engaging tube of the second connector is engaged with an outer periphery of the first connector.

The first engaging part is preferably formed on an inner wall of the cavity of the fixed shaft (or the first shaft).

It is preferable to have a sleeve between an outer periphery of the first connector and an inner wall of the cavity of the fixed shaft (or the first shaft).

It is preferable that the motor has a plurality of coils, and the roller body or the casing houses at least a part of a circuit for supplying current to the coils.

The motorized roller in the present aspect is a motorized roller having a configuration so called built-in board type. At least a part of a circuit for supplying current to the coils is housed in the roller body. In the case of a brushless motor, for example, current is sequentially supplied to each coil so as to generate a rotating magnetic field or an alternating magnetic field inside. With a coil A, a coil B, and a coil C inside, for example, current is supplied only to the coil A at first, then only to the coil B, only to the coil C at last, again only to the coil A, and so on. That requires switching of an energization circuit. The motorized roller in the present aspect houses such the above-mentioned switching circuit, for example, within the roller body.

The motorized roller in the present aspect houses a part or all of the circuit for supplying current to the coils in the roller body, so as to require fewer electric power lines or fewer signal lines for conducting inside and outside of the roller body. Consequently, the fixed shaft has a simplified configuration inside.

Further, a motorized roller may be manufactured by using the motor unit for a motorized roller.

Specifically, the roller body is of a hollow tubular shape, and the motorized roller further includes a motor unit; a pair of lids closing the both ends of the roller body; and a shaft supporting member positioned in the roller body, the motor unit including: a cylindrical casing housed in the roller body; a first shaft protruding out of a distal end of the casing and having a free end; a first holder fixing a proximal end portion of the first shaft to a distal end portion of the casing; a driving shaft protruding out of a proximal end of the casing; and a stator and a rotor of the motor, the stator being fixed to an inner surface of the casing with the rotor held rotatively in the stator so that a rotational force of the rotor is transmitted to the driving shaft, the first shaft protruding out of the distal end of the casing with being held by the first holder, the first shaft having the first connector, the first shaft having a portion adjacent to the free end and protruding out of a distal end of the roller body so as to serve as one of the fixed shafts, the portion of the first shaft being supported by the lids rotatably relative to the roller body, the driving shaft being positioned in the roller body, held on a central axis of the roller body by the shaft supporting member, and united integrally with the roller body about rotation via the shaft supporting member, and the motorized roller further comprising a second shaft mounted rotatively relative to the roller body on a proximal end of the roller body.

The motorized roller may have a hollow part where no member exists in a part in an axial direction in the roller body.

The present aspect is a recommended configuration for a long motorized roller.

In the aspects relating to the motor unit for a motorized roller, the unit may be inserted into a roller body having discretionary length and diameter, thereby completing a motorized roller having discretionary length and diameter.

Further, the unit in the aspects prevents disengagement of the second connector even with vibration of the fixed shaft since the unit has the first engaging part for preventing disengagement of the second connector so that a part of the second connector is mechanically engaged with the first engaging part.

Advantageous Effect of the Invention

The motorized roller in the present invention incorporates a power feeding part for feeding power to a motor housed in the fixed shaft, thereby having such an advantageous effect as facilitating taking of the power feeding part out of an area surrounded by frame members and facilitating assembling of a conveyor. The motorized roller in the present invention further has such an advantageous effect as most likely keeping the second connector and lessening the likelihood of breakdown.

DESCRIPTION OF THE PREFERRED EMBODIMENTS

Now, a preferred embodiment of the present invention will be described in detail below, making reference to the accompanying drawings.

A motorized roller 3 in the present embodiment is characterized in that a first fixed shaft 20 houses a first connector (also called "a fixed-side connector") 25, to which a second connector (also called "a free-side connector") 33 is connected, so as to feed power and/or connect signal lines. Prior to descriptions of these, a basic structure of the motorized roller 3 will be described in detail.

Figure 1:
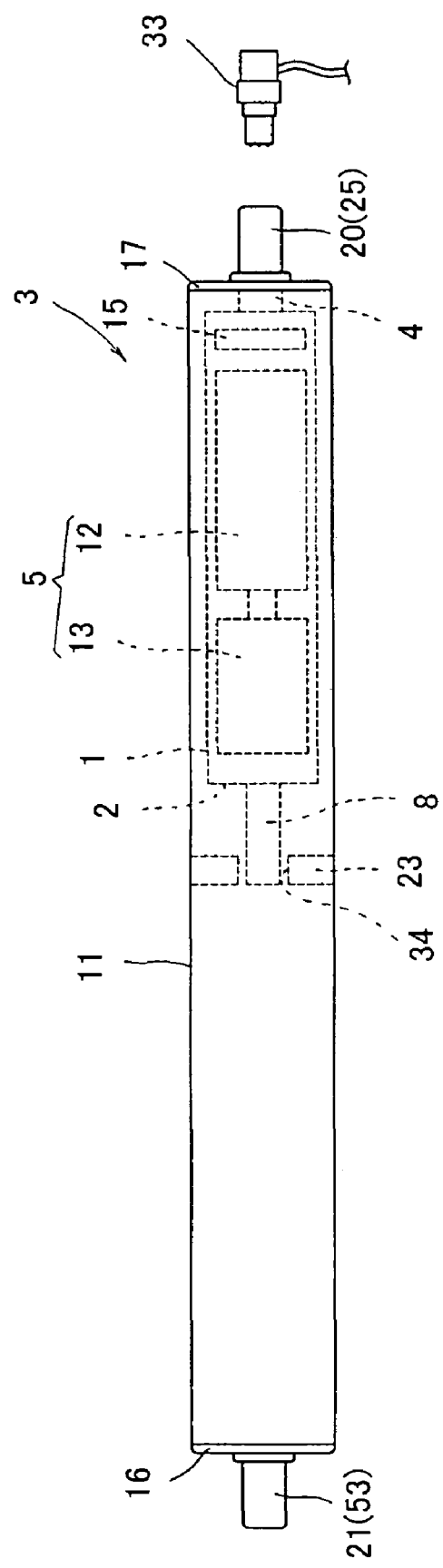
FIG. 1 is a front view of a motorized roller in an embodiment of the present invention.

FIG. 1 shows the motorized roller 3 in the embodiment of the present invention. The motorized roller 3, as well as the known art, includes a roller body 11 of a cylindrical shape and a motor 12 and a reducer 13 housed in the roller body 11. In the motorized roller 3 in this embodiment, the motor 12, the reducer 13, and a circuit board 15 are unitized. In other words, the motorized roller 3 in this embodiment incorporates a motor unit 1 for a motorized roller (hereinafter referred to simply as a motor unit 1) in the roller body 11. The motor unit 1, as shown in FIG. 4, mainly consists of the motor 12, the reducer 13, and the circuit board 15 housed in a cylindrical casing 2.

Figure 3:
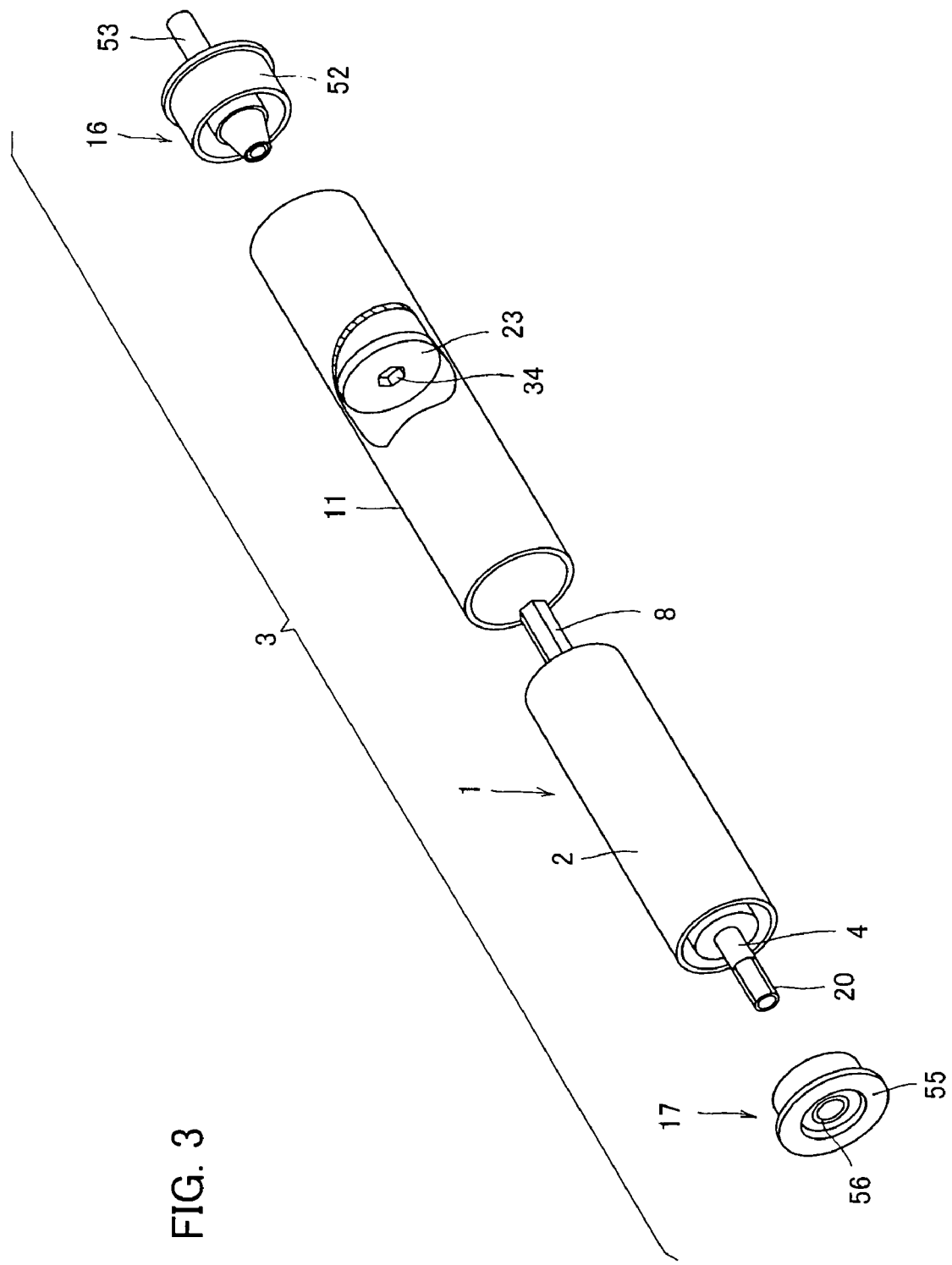
FIG. 3 is an exploded perspective view of the motorized roller shown in FIG. 1.
Figure 4:
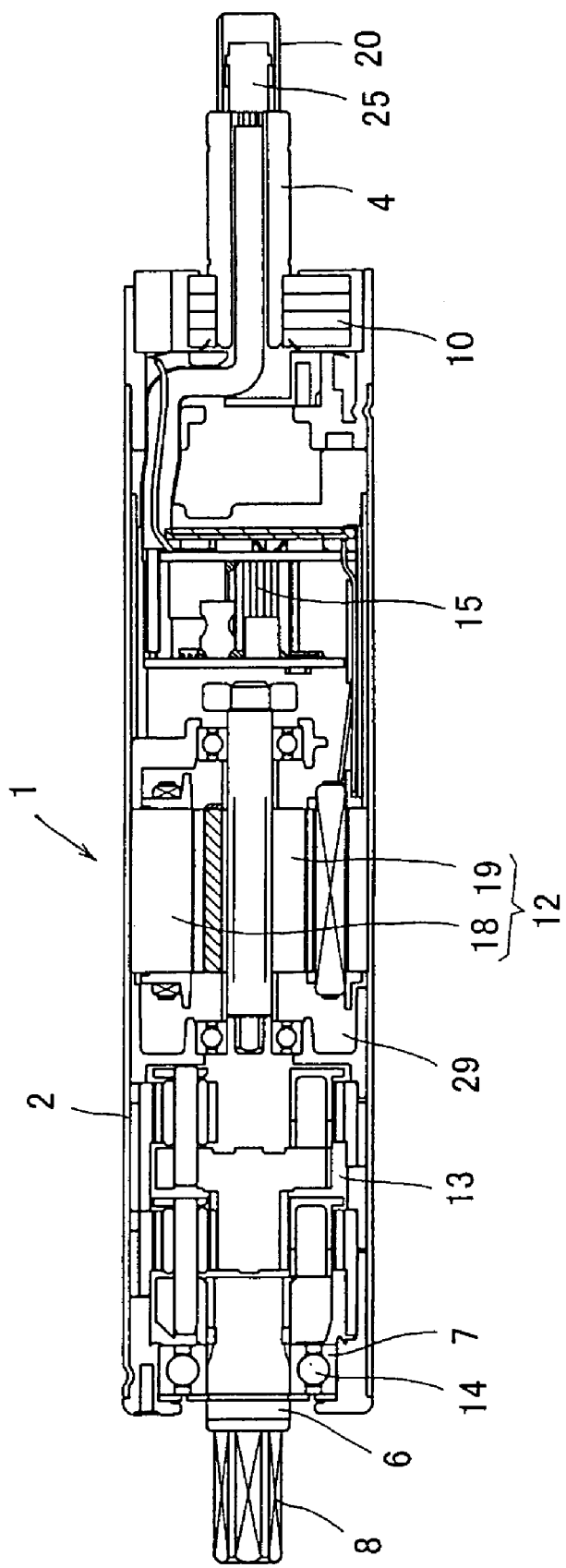
FIG. 4 is a cross section of a motor unit incorporated in the motorized roller shown in FIG. 1.

In FIGS. 3 and 4, the numeral 1 denotes the motor unit in the embodiment of the present invention.

Referring to FIG. 4, the motor unit 1 mainly consists of the casing 2, a first shaft (also called "a fixed-side short shaft") 4 protruding out of a distal end of the casing 2, a driving part 5 and the circuit board 15 housed in the casing 2, and a driving shaft 8 protruding out of a proximal end of the casing 2 and rotating upon reception of a driving force from the driving part 5.

The motor unit 1 is covered with the cylindrical casing 2, in which the driving part 5 is housed. The driving part 5 is specifically composed of the motor 12 and the reducer 13.

The driving shaft 8 is exposed to the proximal end of the casing 2, whereas the first shaft 4 is exposed to the distal end thereof.

The first shaft 4 and the driving shaft 8 are attached to the both ends of the casing 2 by a first holder 10 for holding the fixed shaft (or first shaft) and a second holder 7 for holding the driving shaft, respectively.

The casing 2 is a cylinder made of metal, being open at its both ends. The second holder 7 is made from a material such as resin, being of a substantially cylindrical shape and having an outer diameter equal to an inner diameter of the casing 2 so as to be fitted in the proximal end (on the extreme left in FIG. 4) of the casing 2.

Further, the second holder 7 has a shaft bearing 14 therein. The shaft bearing 14 has an inner diameter equal to a diameter of the driving shaft 8, holding the driving shaft 8 without obstructing rotation of an output shaft 6. The output shaft 6 rotates relatively to the casing 2.

On the other hand, the first holder 10 is of a substantially cylindrical shape as well and fitted in the distal end (on the extreme right in FIG. 4) of the casing 2.

The first holder 10 is directed to fix the first shaft 4 integrally to the casing 2, having an inner diameter equal to a diameter of the first shaft 4. The first holder 10 indivisibly unites the first shaft 4 and the casing 2, having no shaft bearing.

The first shaft 4 is disposed at a distal end and on a central axis of the motor unit 1 and integrally fixed to the casing 2 by the first holder 10. The first shaft 4 has an inner cavity, in which the first connector 25 described below is housed.

The driving part 5 is composed of the motor 12 and the reducer 13, as described above. The motor 12 is a brushless motor constituted by a stator 18 and a rotor 19. In the present embodiment, the stator 18 is integrally mounted on an inner surface of the casing 2. The rotor 19 is held rotatively and coaxially in the stator 18. In the embodiment, there is provided a rotor holding member 29 on the inner surface of the casing 2, so that the rotor 19 is held as mentioned above via the rotor holding member 29.

In the present embodiment, a permanent magnet is used as the rotor 19 and coils are used as the stator 18.

An element such as a Hall element is used as a magnetic pole detector.

The circuit board 15 incorporates a switching circuit and has a part of a circuit for supplying current to the coils of the stator 18.

Figure 9:
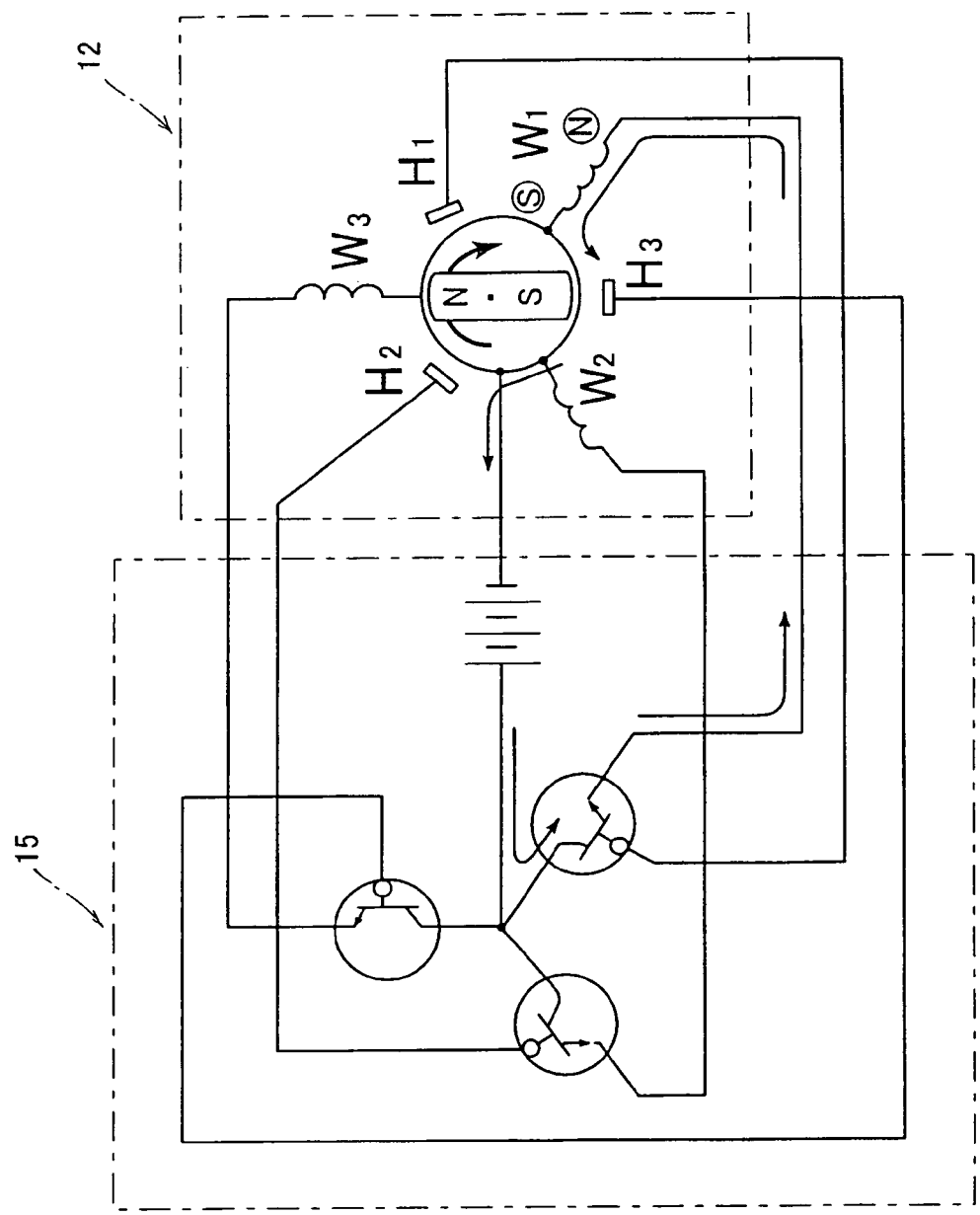
FIG. 9 is a circuit diagram of the motorized roller shown in FIG. 1.

As described above, the motor 12 employed in this embodiment is a brushless motor, in which the stator 18 has three coils W1, W2, and W3 as shown in a circuit diagram in FIG. 9. Further, the motor 12 has Hall elements H1, H2, and H3 for detecting a rotational position of the permanent magnet of the rotor 19.

The motor 12 has the switching circuit for supplying current sequentially to the coils W1, W2, and W3, whereby a rotating magnetic field is generated therewithin. The switching circuit is contained in the circuit board 15.

The reducer 13 is located between the motor 12 and the driving shaft 8, being directed to reduce a rotational speed of the motor 12 so as to transmit the reduced speed to the output shaft 6.

Each member in the casing 2 is laid out in FIG. 4. The first shaft 4 is fixed to the distal end of the casing 2 by the first holder 10 and terminates at a distal end portion of the casing 2, thus not penetrating through the casing 2.

The circuit board 15 is located behind the first holder 10. The motor 12 and the reducer 13 are located further behind the circuit board 15. The reducer 13 has an output shaft serving as the driving shaft 8 and protruding out of the proximal end of the casing 2.

The motor unit 1 is described above and now the motorized roller 3 incorporating said motor unit will be described in detail below.

The motorized roller 3 includes the above-mentioned motor unit 1, the roller body 11, a shaft supporting member 23 which is positioned in the roller body 11, and lids 16 and 17 (FIG. 3).

The roller body 11 is a cylinder having both ends being open. The supporting member 23 is, as shown in FIG. 3, integrally fixed in the roller body 11 and has a hexagonal opening 34 in its center.

Figure 2:
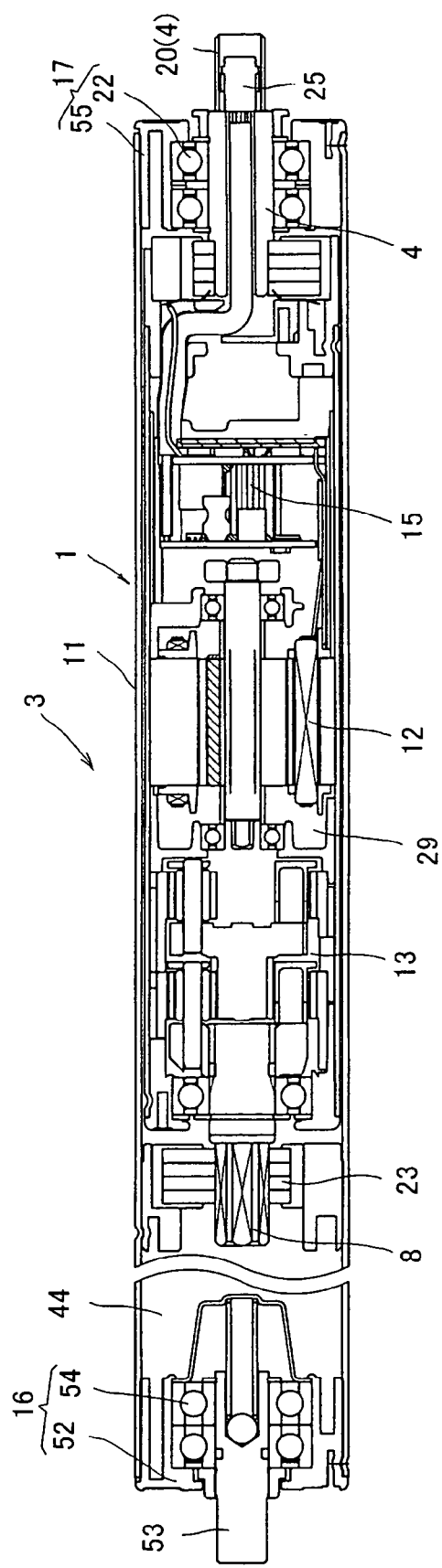
FIG. 2 is a cross section of the motorized roller shown in FIG. 1.

The lid 16 is, as shown in the extreme left in FIG. 2, an integral piece of a roller body engaging member 52 of a cylindrical shape, a double-shaft bearing 54, and a second shaft (i.e., a short shaft fixed to a proximal end portion of the roller body) 53. The other lid 17 is, as shown in the extreme right in FIG. 2, an integral piece of another roller body engaging member 55 and another double-shaft bearing 22.

In the motorized roller 3 in this embodiment, the motor unit 1 is inserted in the roller body 11 with the driving shaft 8 of the motor unit 1 engaged with the opening 34 of the shaft supporting member 23. Further, the lids 16 and 17 are attached to the both ends of the roller body 11. Specifically, as shown in FIGS. 2 and 3, the lid 17, which is the integral piece of the roller body engaging member 55 and the shaft bearing 22, is mounted on a distal end (adjacent to the first shaft 4 of the motor unit 1) of the roller body 11.

At this time, the first shaft 4 of the motor unit 1 is inserted in an inner ring of the bearing shaft 22 so that a circular cross-sectional portion of a proximal end portion of the first shaft 4 is brought into contact with the inner ring of the bearing shaft 22.

Thus, a free end of the first shaft 4 protrudes out of the roller body 11. In this embodiment, a distal end portion of the first shaft 4 protruding out of the roller body 11 serves as the first fixed shaft 20 of the motorized roller 3.

On the other hand, the lid 16, which is the integral piece of the roller body engaging member 52, the shaft bearing 54, and the second shaft 53, is mounted on a proximal end of the roller body 11.

In this embodiment, the second shaft 53 serves as the second fixed shaft 21 of the motorized roller 3.

In the motorized roller 3 in this embodiment, the both fixed shafts 20 and 21 do not penetrate through the roller body 11. The shafts 20 and 21 both are short and only fixed to the both ends of the roller body 11. More specifically, the first fixed shaft 20 supports only the distal end of the roller body 11 and the distal end of the casing 2 of the motor unit 1, whereas the second fixed shaft 21 supports only the proximal end of the roller body 11.

Further, in this embodiment, the first fixed shaft 20 only supports the distal end of the casing 2 of the motor unit 1, and thus the motor 12 and the reducer 13 are held in the casing 2.

The motorized roller 3 in this embodiment further has a hollow part 44 in which no member exists in a part in an axial direction in the roller body 11.

Back to the whole description of the motorized roller 3, in the motorized roller 3 employed in this embodiment, the fixed shafts 20 and 21 protrudes out of the both ends of the roller body 11, as described above. More specifically, the lids 16 and 17 are attached to the both ends of the roller body 11 with the fixed shafts 20 and 21 protruding out of the lids 16 and 17 respectively. Herein, the shaft bearings 22 and 54 are interposed between the roller body 11 and the fixed shafts 20 and 21 respectively. The roller body 11 rotates relatively to the fixed shafts 20 and 21. The first fixed shaft 20 has a cross-sectional shape of "D", which is chamfered at one face.

Figure 5:
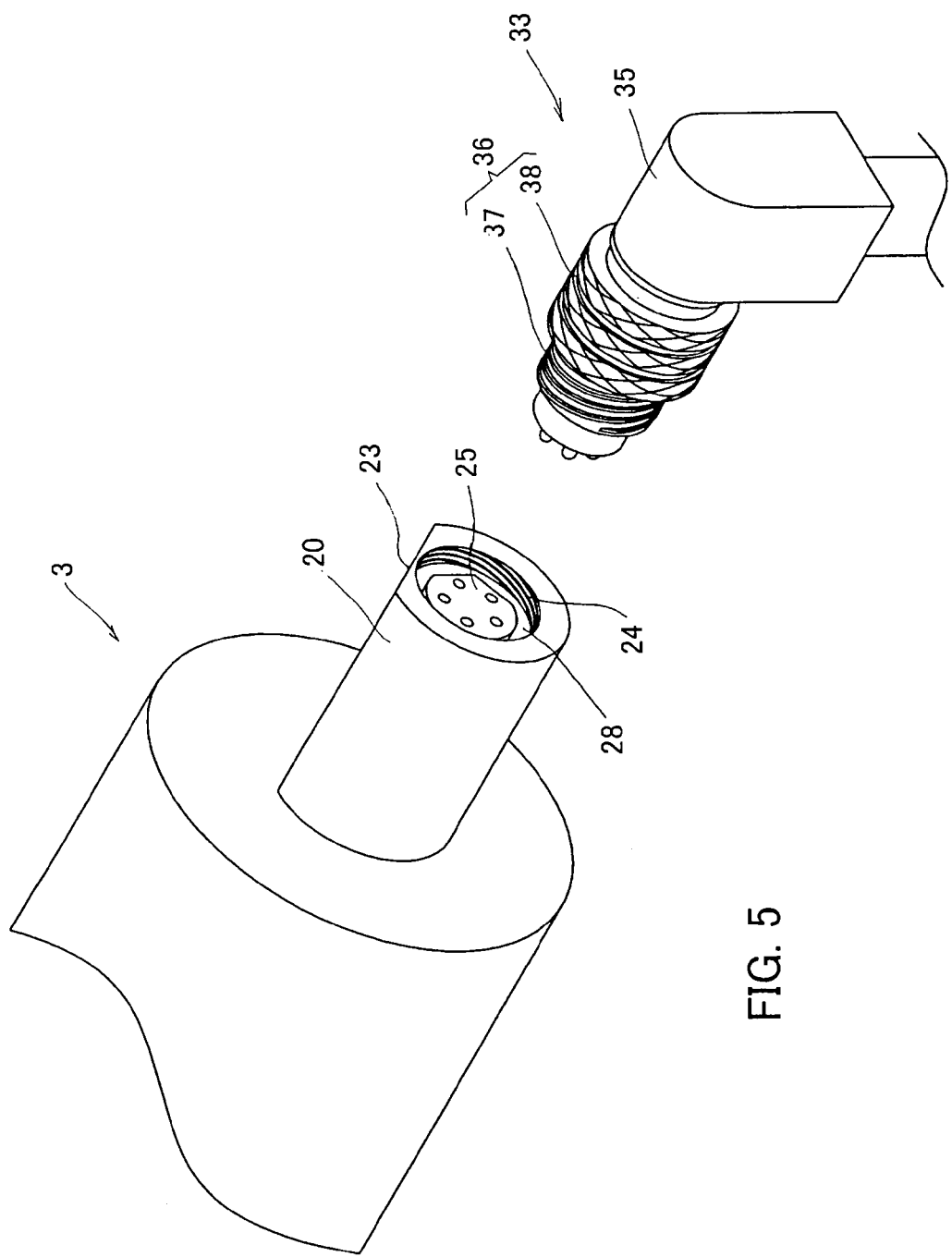
FIG. 5 is a perspective view of a distal end portion of the motorized roller shown in FIG. 1 and a second connector.
Figure 6:
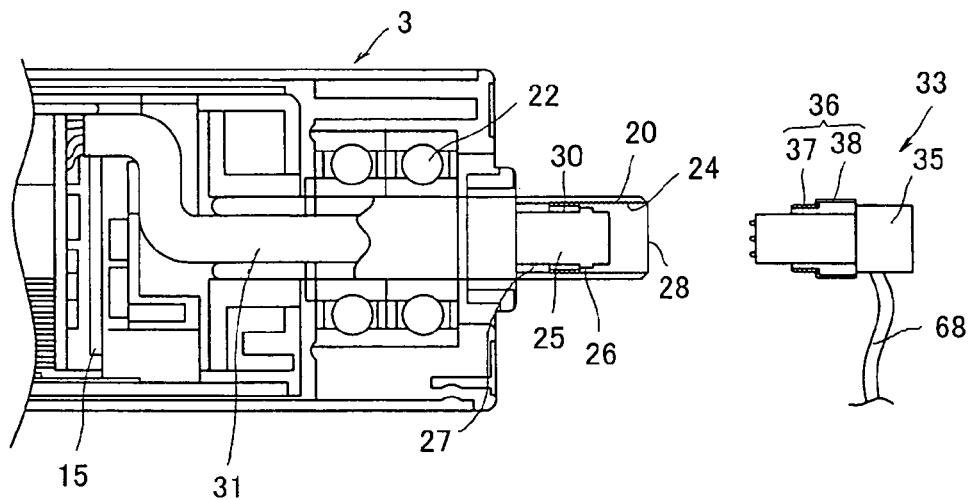
FIG. 6 is a cross section of the distal end portion of the motorized roller shown in FIG. 1 and the second connector, which are disengaged from each other.
Figure 7:
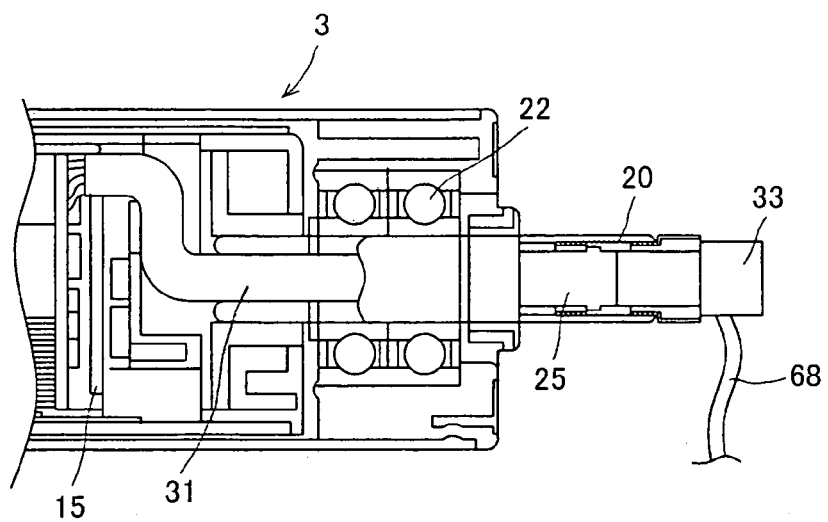
FIG. 7 is another cross section of the distal end portion of the motorized is roller shown in FIG. 1 and the second connector, which are engaged with each other.
Figure 8:
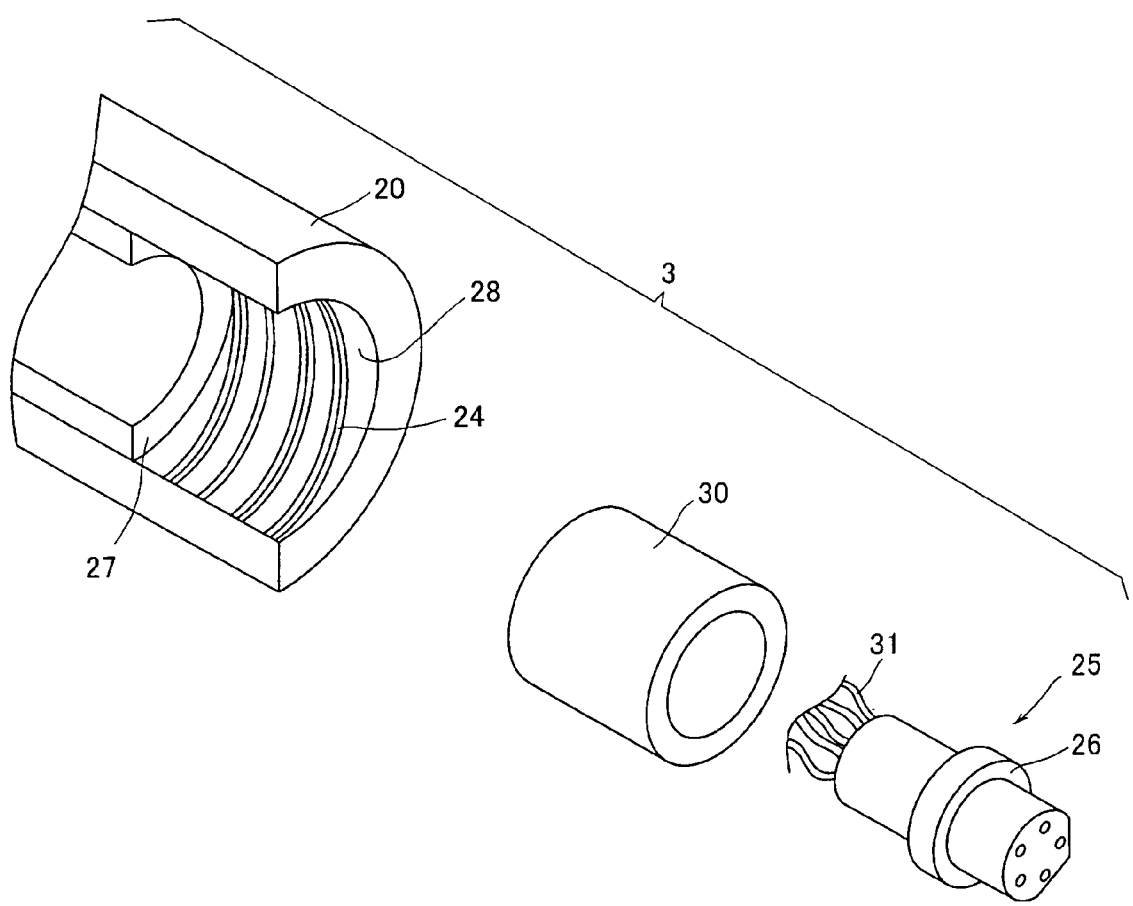
FIG. 8 is an exploded perspective view of the distal end portion of the motorized roller shown in FIG. 1.

Referring to FIGS. 5, 6, and 7, the first fixed shaft 20 (or first shaft 4) adjacent to the motor unit 1 is of a hollow shape and houses the first connector 25 therein.

The first connector 25 is a female connector having five pin holes as shown in the figures and having a columnar shape with a flange 26 at its periphery.

The first fixed shaft 20 has an elongated hole or cavity 28 extending in an axial direction. The first fixed shaft 20 has a larger inner diameter adjacent to its free end and a smaller inner diameter adjacent to the roller body 11. That is, the first fixed shaft 20 has a step 27 inside.

The first fixed shaft 20 further has an inside screw 24 serving as a first engaging part (also called as "a shaft-side engaging part"), which is formed on an inner periphery/surface of the cavity extending around the central axis of the motor unit 1 adjacent to its free end (larger diameter-side).

The first connector 25 is inserted with a sleeve 30 in the cavity 28 within the first fixed shaft 20. The sleeve 30 comes to an outer periphery of a proximal end (a side without the pin holes in the figures) of the first connector 25, so that the first connector 25 is inserted in the cavity 28 with a pin hole-side situated outward. The sleeve 30 has a proximal face contacting with the step 27 in the cavity 28 and a distal face contacting with the flange 26 of the first connector 25. That means, the flange 26 of the first connector 25 contacts with the step 27 in the cavity 28 via the sleeve 30, so that the first connector 25 is positioned in the axial direction.

The first connector 25 is protected from removing outward because the first connector 25 and the cavity 28 and the sleeve 30 within the first fixed shaft 20 are joined with glue not shown.

Within the roller body 11, electrically conductive leads 31 extending from the proximal end of the first connector 25 are connected to the circuit board 15, through which power is fed to the motor 12. The motorized roller 3 in this embodiment is a roller with a built-in board, thus having five leads. However, in the case that the present invention is applied to a motorized roller without a built-in board, more leads are needed and more pin holes of the first connector 25 are needed in accordance with the leads.

In the motorized roller 3 in this embodiment, the second connector 33 is to be connected to the first connector 25.

The second connector 33 is a male connector with five pins.

The second connector 33 is, as shown in FIGS. 5 and 6, constituted by a connector body 35 and a screw ring 36.

The screw ring 36 is mounted on an outer periphery of the connector body 35, being rotatable relative to the connector body 35 but moving in an axial direction of the body 35 integrally therewith.

The screw ring 36 has a screw forming part 37 and a grip 38, the latter having a larger diameter than the former.

An outside screw serving as a second engaging part (also called as "a connector-side engaging part") is formed on an outer periphery of the screw forming part 37. The grip 38 has an outer diameter equal to that of the first fixed shaft 20 and has knurling around an outer periphery of the grip 38.

In the motorized roller 3 in this embodiment, the first connector 25 and the second connector 33 are connected to each other by insertion of the connector body 35 of the second connector 33 into the cavity 28 of the first fixed shaft 20.

Turning of the screw ring 36 with the connector body 35 inserted in the cavity 28 engages the outside screw (male screw) formed on the screw ring 36 with the inside screw 24 formed in the cavity 28 of the first fixed shaft 20. Herein, since the screw ring 36 is rotatable relative to the connector body 35 but moves in the axial direction integrally with the connector body 35, turning of the screw ring 36 with the outside screw (male screw) of the screw ring 36 engaged with the inside screw 24 of the first fixed shaft 20 allows the second connector 33 to move toward the cavity 28. The second connector 33 is screwed with the first fixed shaft 20, thus avoiding disengagement from the first fixed shaft 20.

The first connector 25 is housed in the cavity 28 of the first fixed shaft 20 in this embodiment as shown in FIG. 5, but may be disposed on the distal face of the first fixed shaft 20.

Figure 10:
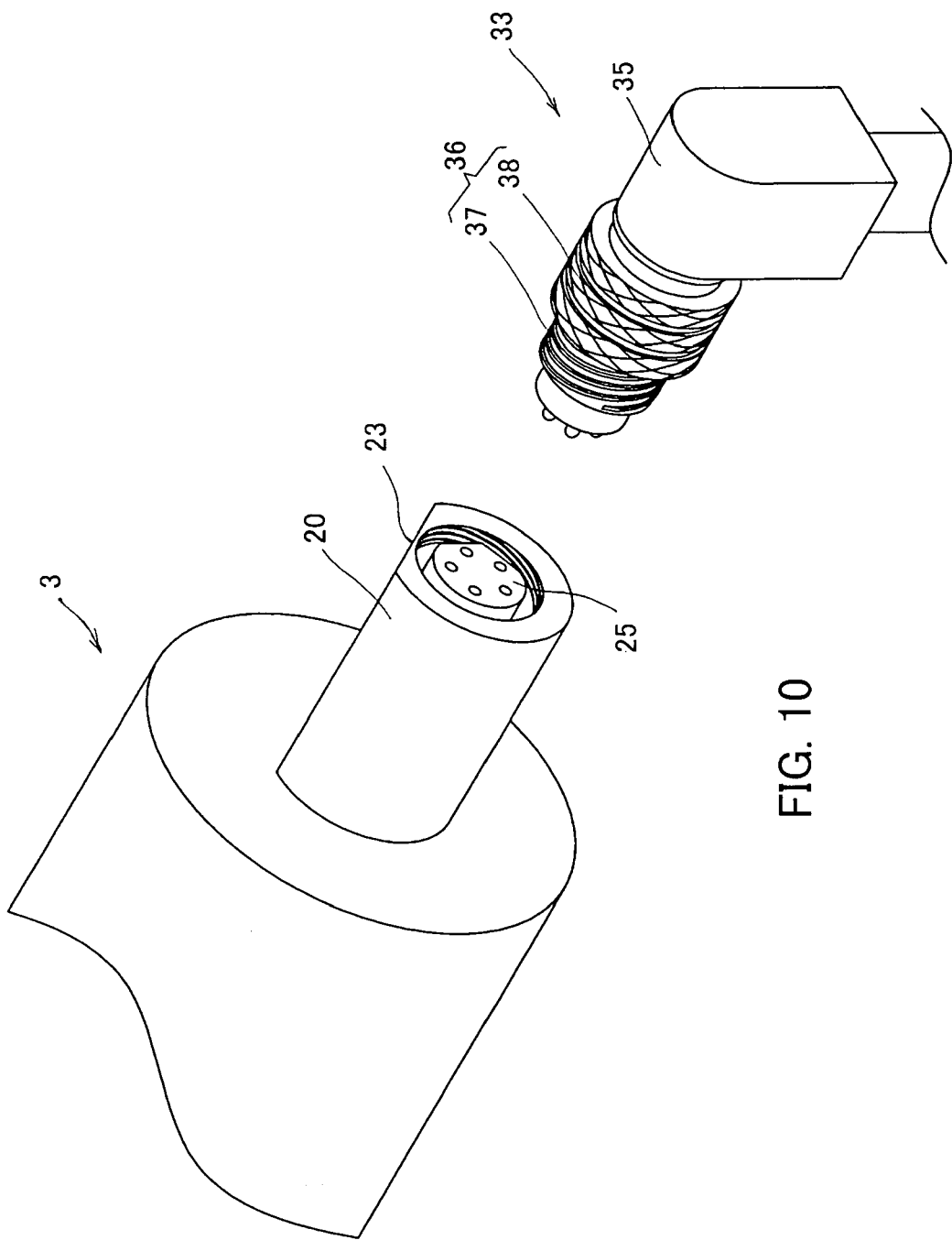
FIG. 10 is a perspective view of a distal end portion of a modified motorized roller and the second connector in another embodiment of the present invention.
Figure 11:
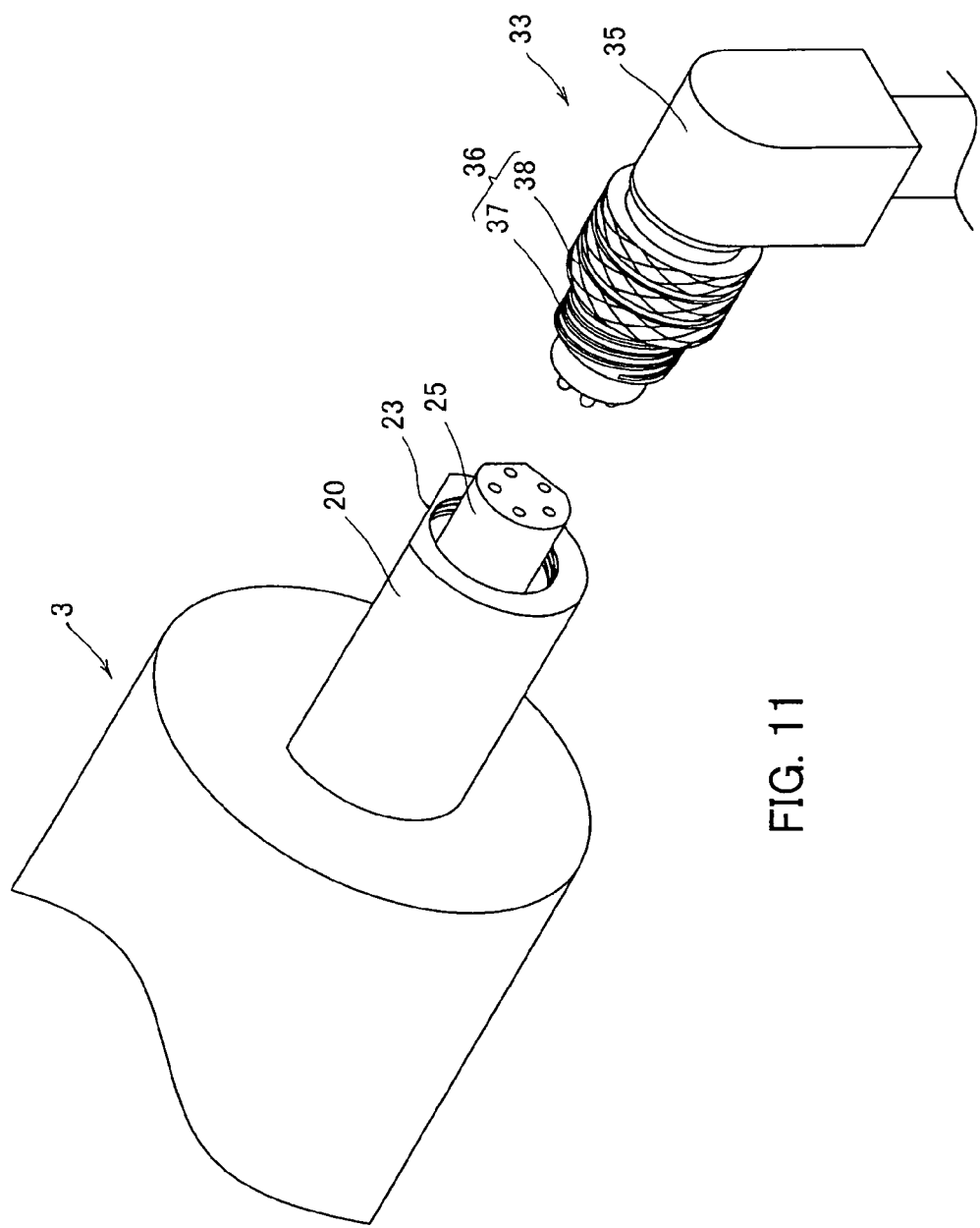
FIG. 11 is a perspective view of a distal end portion of a modified motorized roller and the second connector in still another embodiment of the present invention.

FIGS. 10 and 11 each are a perspective view of a distal end portion of a modified motorized roller and a second connector in another embodiment of the present invention.

The motorized roller 3 shown in FIG. 10 has a distal surface of the first fixed shaft 20 flush with a distal surface of the first connector 25. The motorized roller 3 shown in FIG. 11 has the first connector 25 protruding out of the distal surface of the first fixed shaft 20.

The free connectors 33 in the above-mentioned embodiments each are engaged with the first fixed shaft 20 by means of a screw, but it is possible to employ another engaging means.

Another configuration for engaging a second connector 62 with a first fixed shaft 61 by means of a nail will be described below.

Figure 12:
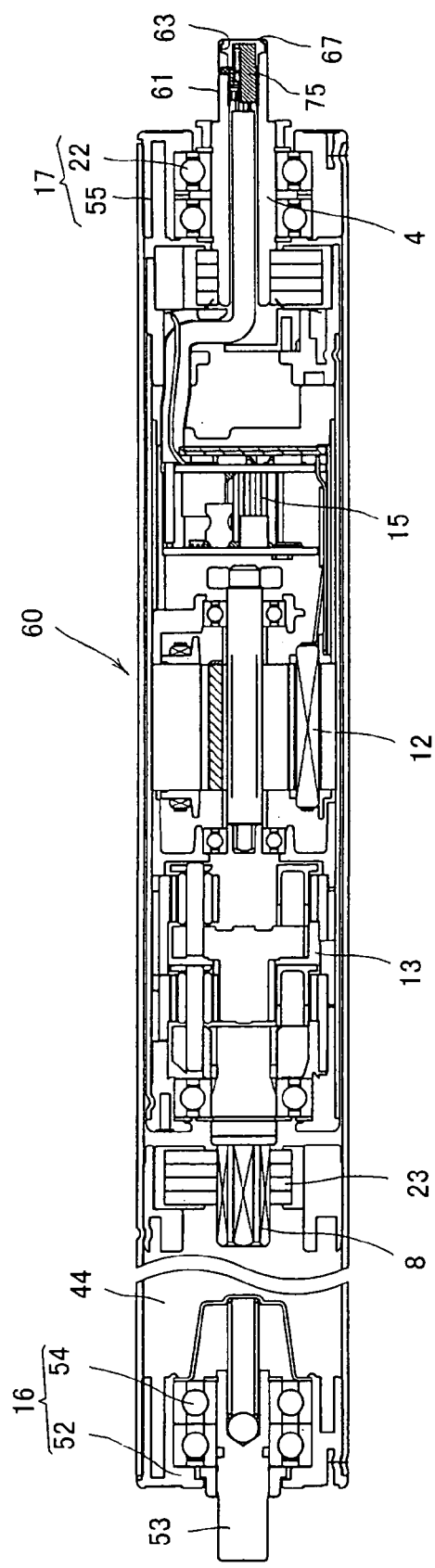
FIG. 12 is a partly enlarged cross section of a modified motorized roller in yet another embodiment of the present invention.

A motorized roller 60 shown in FIG. 12 has the same configuration and components as those in the above-mentioned embodiments except the second connector 62 and a configuration within the first fixed shaft 61. Thus, the same numerals are assigned to the same components, and duplicated descriptions are omitted.

Figure 20:
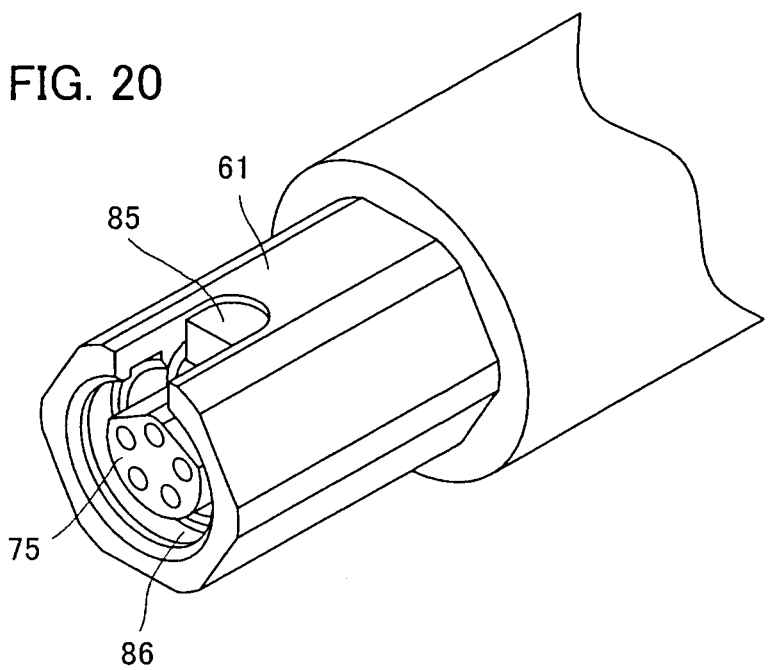
FIG. 20 is a perspective view of the fixed shaft shown in FIG. 19.

Referring to FIG. 20, the motorized roller 60 in this embodiment has the first fixed shaft 61, which is of a hollow hexagonal shape and houses a first connector 75.

Figure 21:
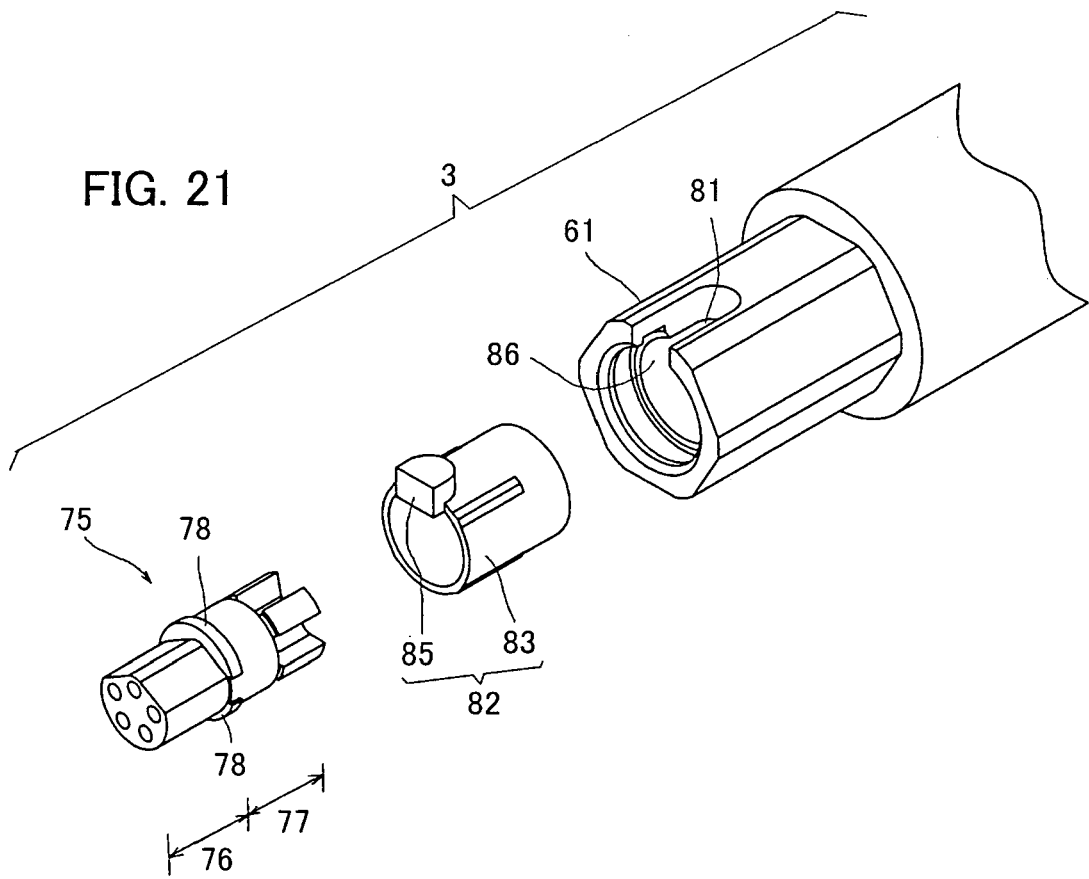
FIG. 21 is an exploded perspective view of the fixed shaft shown in FIG. 12.

The first connector 75 is, as shown in FIG. 21, a female connector having five pin holes. The first connector 75 is different in shape in a distal portion 76 and a proximal portion 77. The distal portion 76 has a distal end surface with the above-mentioned five pin holes. The distal portion 76 is of a substantially cylindrical shape chamfered at two faces.

The proximal portion 77 is of a cylindrical shape. There is provided two connector-side contacting projections 78 disposed at opposed positions between the distal portion 76 and the proximal portion 77.

The first fixed shaft 61 is of a hexagonal cross section and has an elongated and hollow hole or cavity 86 extending in an axial direction.

Figure 19:
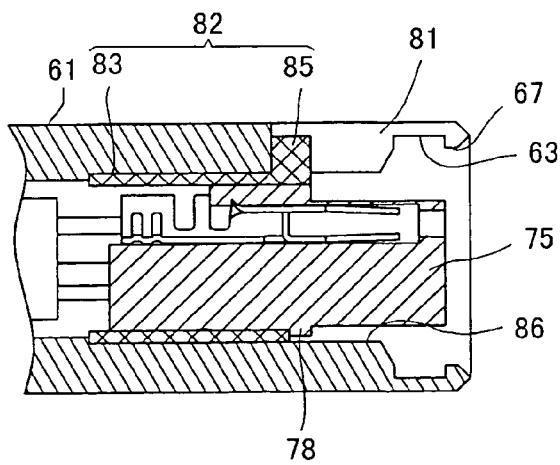
FIG. 19 is a cross section of a fixed shaft of the motorized roller in the embodiment shown in FIG. 12.

As shown in FIG. 19, the first fixed shaft 61 has an annular groove 63 formed on its inner surface and adjacent to its open end. Thus, the first fixed shaft 61 has a step on the inner surface with an annular projection 67, which serves as a first engaging part (shaft-side engaging part), on an inner surface of the open end.

Referring to FIGS. 20 and 21, the open end of the first fixed shaft 61 has a U-shaped notch or slot 81 extending in an axial direction.

The first connector 75 is inserted with a sleeve 82 in the cavity 86 within the first fixed shaft 61. The sleeve 82, as shown in FIG. 21, has a tube part 83 and a sleeve-side contacting projection 85 at a side and a longitudinal edge of the tube part 83.

The sleeve 82 is mounted on an outer periphery of a proximal end (a side without the pin holes in the figures) of the first connector 75, so that the first connector 75 is inserted in the cavity 86 with a pin hole-side situated outward. In the cavity 86 within the first fixed shaft 61, the sleeve-side contacting projection 85 of the sleeve 82 is inserted in the notch 81 of the cavity 86 so as to contact with a proximal end of the notch 81, so that the sleeve 82 is positioned in the cavity 86 within the first fixed shaft 61.

The connector-side contacting projection 78 of the first connector 75 contacts with an end surface of the sleeve 82, so that the first connector 75 is positioned in the cavity 86 within the first fixed shaft 61.

Figure 13:
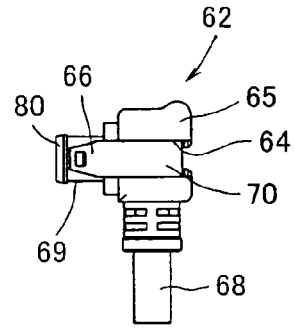
FIG. 13 is a front view of a second connector employed in the embodiment shown in FIG. 12.
Figure 14:
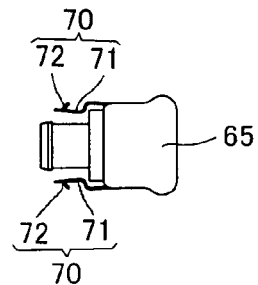
FIG. 14 is a plan view of the second connector shown in FIG. 12.
Figure 15:
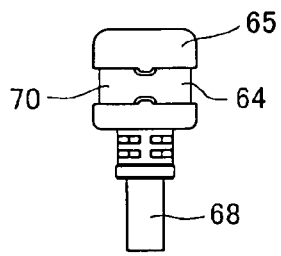
FIG. 15 is a right side view of the second connector shown in FIG. 12.
Figure 16:
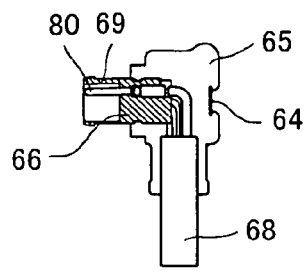
FIG. 16 is a cross-sectional front view of the second connector shown in FIG. 12.
Figure 17:
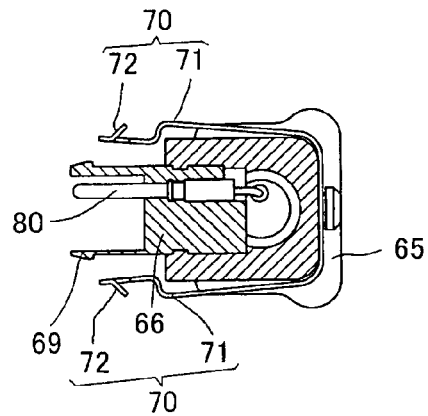
FIG. 17 is a cross-sectional plan view of the second connector shown in FIG. 12.
Figure 18:
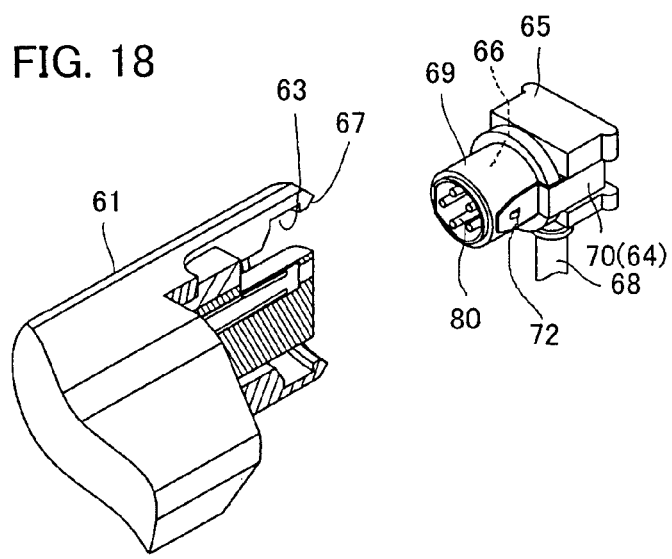
FIG. 18 is a cross-sectional perspective view of a distal end portion of the motorized roller in the embodiment shown in FIG. 12 and a perspective view of a second connector.

On the other hand, as shown in FIGS. 13 to 15, the second connector 62 has a main part 65 of a substantially L shape, a connecting part 80 at a side of the main part 65, and a cord 68 extending to a right angle relative to the connecting part 80.

The connecting part 80 has a main body 66 with five pins protruding out of the body 66. The main body 66 is provided with an engaging tube 69 therearound. The engaging tube 69 has a distal end coming before the main body 66.

The main part 65 has on its side a groove 64, in which an engaging piece 70 is fitted. The engaging piece 70 is made of an elastic material such as a spring steel and has a planar view of a substantially U shape. Specifically, the engaging piece 70 is made by bending a piece of belt-like member, in which a pair of parallel pieces 71 are joined at an intermediate portion and distal ends of the parallel pieces 71 being open as free ends. Each of the parallel pieces 71 is cantilevered and has a flexible free end. Therefore, the free ends of the both pieces 71 deflect or bend in directions away from and toward each other.

Each of the parallel pieces 71 is tapered at the distal end and has a nail 72 extending outward adjacent to the distal end.

The parallel pieces 71 are cantilevered and deflect at the free ends as described above, so that the nails 72 each have flexibility in directions away from and toward each other.

Figure 22:
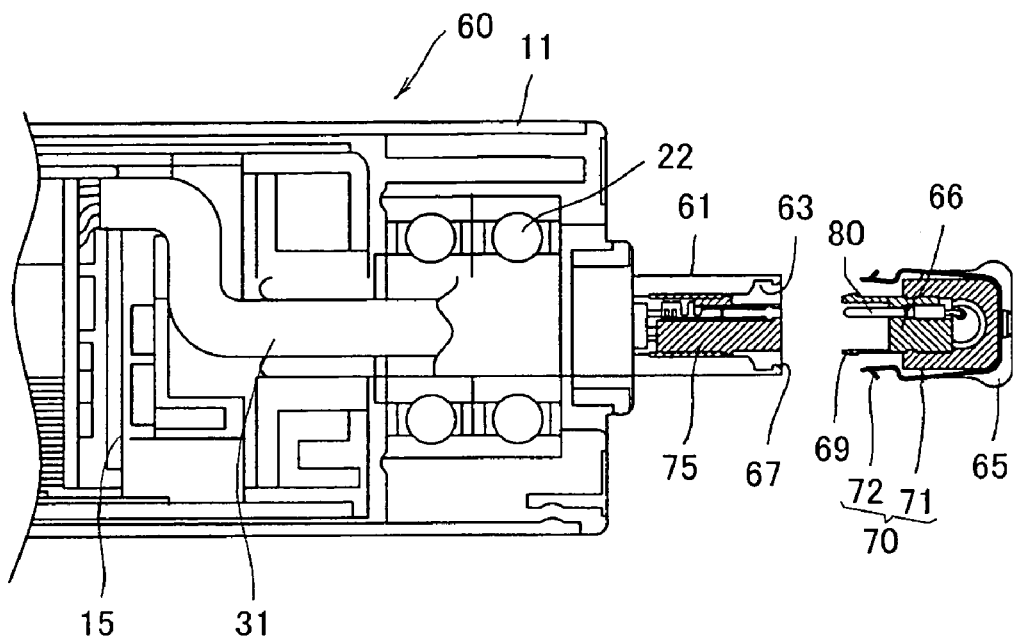
FIG. 22 is a cross section of the distal end portion of the motorized roller shown in FIG. 12 and the second connector, which are disengaged from each other.
Figure 23:
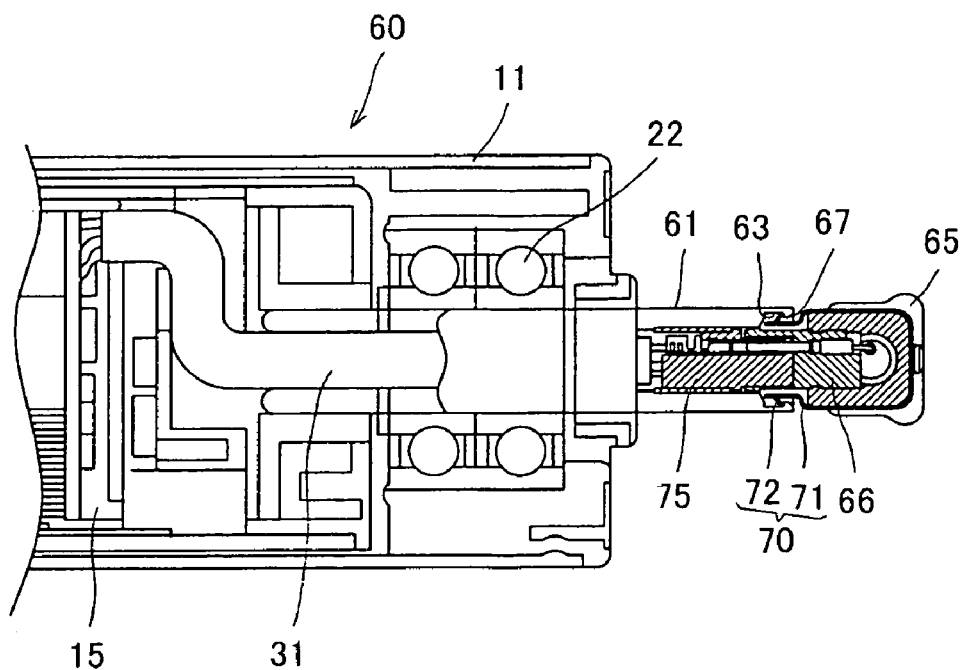
FIG. 23 is a cross section of the distal end portion of the motorized roller shown in FIG. 12 and the second connector, which are engaged with each other.
Figure 24:
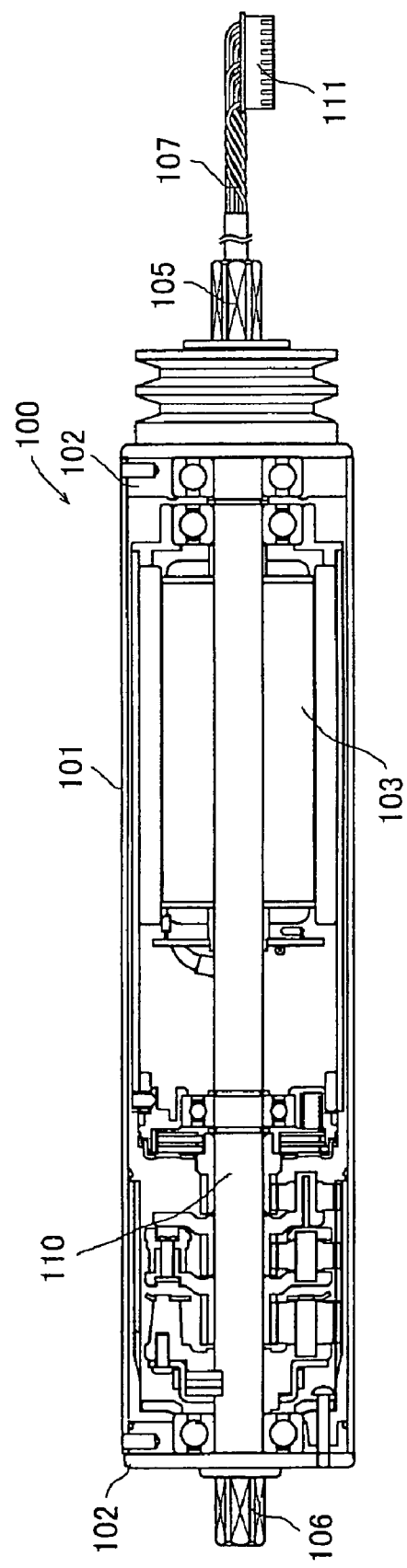
FIG. 24 is a cross section of a motorized roller disclosed in the patent document 1.
Figure 25:
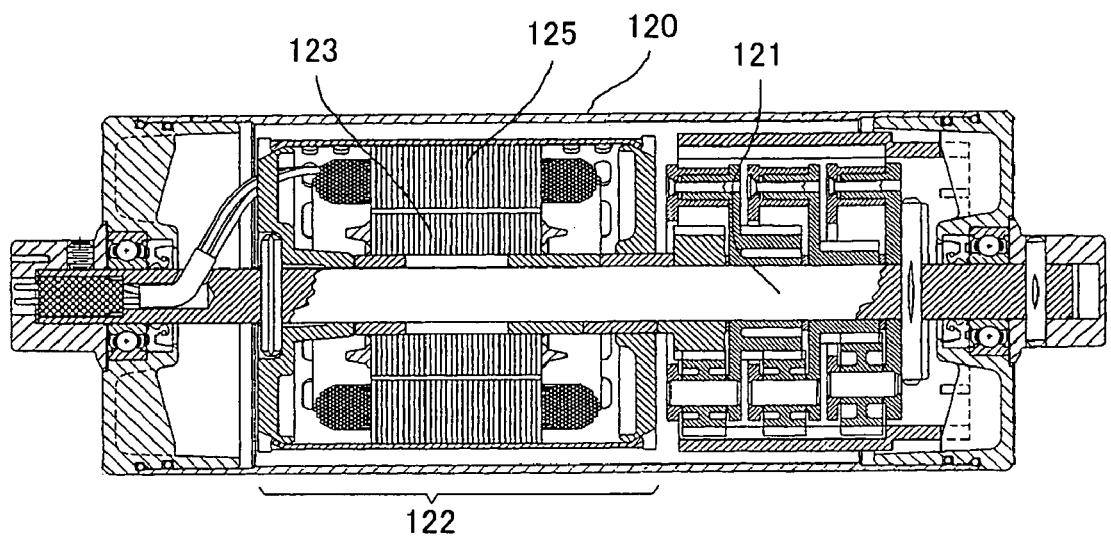
FIG. 25 is a cross section of a motorized roller disclosed in the patent document 4.
Figure 26:
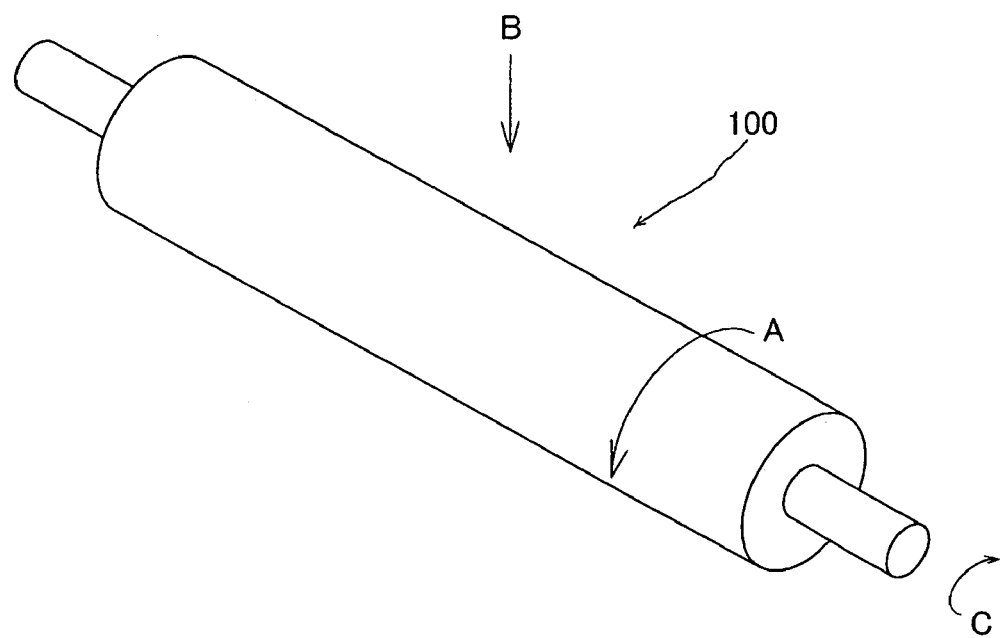
FIG. 26 is an explanatory diagram explaining forces acting on a motorized roller.
Figure 27:
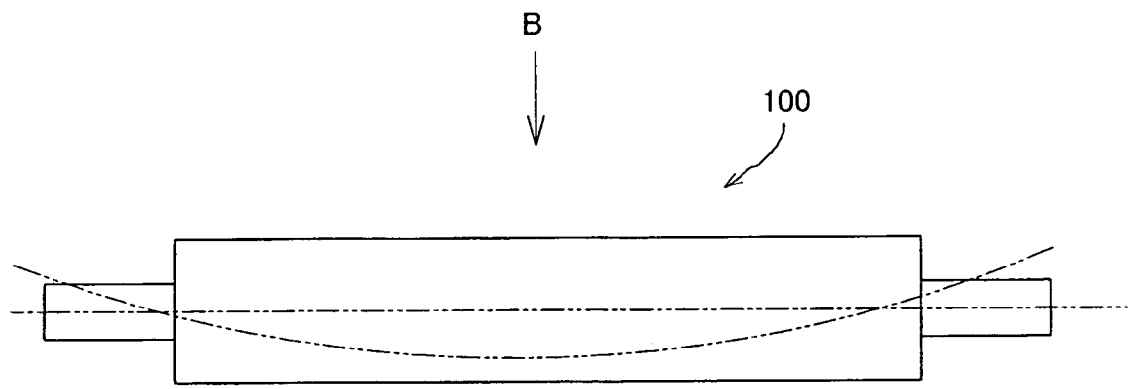
FIG. 27 is an explanatory diagram explaining a motorized roller deflected when an article to be conveyed is placed on the roller.

Also in the motorized roller 60 in this embodiment, as shown in FIGS. 22 and 23, the second connector 62 is connected to the first connector 76.

Specifically, the connecting part 80 of the second connector 62 is inserted into the cavity 86 of the first fixed shaft 61, so that the pins of the second connector 62 are inserted into pin sockets of the first connector 75 within the first fixed shaft 61. At the same time, the engaging tube 69 of the second connector 62 is engaged with the outer periphery of the first connector 75.

Further, the nails 72 formed on the engaging piece 70 of the second connector 62 are inserted into the first fixed shaft 61 so as to be engaged with the annular projection 67 formed on the inner surface of the first fixed shaft 61.

Bringing the second connector 62 into contact with the first fixed shaft 61 and pushing the second connector 62 toward the first fixed shaft 61 make the parallel pieces 71 of the engaging piece 70 deflect and a distance between the nails 72 narrow, thereby inserting the nails 72 into the cavity 86 within the first fixed shaft 61. Then, since the cavity 86 has the groove 63 forming an enlarged diameter, the parallel pieces 71 return to its former state because of its elasticity, so that the nails 72 are engaged with the projection 67.

Consequently, the second connector 62 is engaged with the first fixed shaft 61 by means of the nails 72, so as to be protected from removing from the first fixed shaft 61.

The above-described embodiment has such a configuration that the nails 72 of the second connector 62 are engaged with the inside of the first fixed shaft 61, but the present invention is not limited thereto and may have such a configuration as engaging with an outside of the first fixed shaft 61.

Further, the present invention may be applied to a motorized roller dispensing with a motor unit.

The invention claimed is:

1. A motorized roller, comprising:
a roller body having both ends;
a plurality of fixed shafts with one of the fixed shafts protruding out of each of the both ends of the roller body; and
a motor housed in the roller body,
wherein rotation of the motor rotates the roller body around the fixed shafts,
at least one of the fixed shafts having a cavity and having a first connector at an inside or a distal end of the fixed shaft so as to electrically conduct between inside and outside of the roller body by connection of a separately prepared second connector to the first connector,
wherein the fixed shaft is hollow and has an inner periphery and a first engaging part for preventing disengagement of the second connector, so that a part of the second connector is mechanically engaged with the first engaging part,
including the second connector,
the first connector being arranged within the fixed shaft,
the first engaging part being formed on the inner periphery of the fixed shaft, and
the second connector having a second engaging part at an outer periphery of the second connector,
so that the second connector is attached to the fixed shaft by engagement of the first engaging part with the second engaging part.

2. The motorized roller as defined in claim 1,
the first engaging part being formed on an inner wall of the cavity of the fixed shaft.

3. The motorized roller as defined in claim 1,
having a sleeve between an outer periphery of the first connector and an inner wall of the cavity of the fixed shaft.

4. The motorized roller as defined in claim 1,
the second engaging part being a male screw, and
the first engaging part being a female screw.

5. The motorized roller as defined in claim 1,
the motor having a plurality of coils, and
the roller body housing at least a part of a circuit for supplying current to the coils.

6. The motorized roller as defined in claim 1,
the roller body being of a hollow tubular shape,
wherein the motorized roller further comprises: a motor unit; a pair of lids closing the both ends of the roller body; and a shaft supporting member positioned in the roller body,
the motor unit comprising: a cylindrical casing housed in the roller body; a first shaft protruding out of a distal end of the casing and having a free end; a first holder fixing a proximal end portion of the first shaft to a distal end portion of the casing; a driving shaft protruding out of a proximal end of the casing; and a stator and a rotor of the motor,
the stator being fixed to an inner surface of the casing with the rotor held rotatively in the stator so that a rotational force of the rotor is transmitted to the driving shaft,
the first shaft protruding out of the distal end of the casing with being held by the first holder, the first shaft having the first connector,
the first shaft having a portion adjacent to the free end and protruding out of a distal end of the roller body so as to serve as one of the fixed shafts,
the portion of the first shaft being supported by the lids rotatably relative to the roller body,
the driving shaft being positioned in the roller body, held on a central axis of the roller body by the shaft supporting member, and united integrally with the roller body about rotation via the shaft supporting member, and
the motorized roller further comprising a second shaft mounted rotatively relative to the roller body on a proximal end of the roller body.

7. The motorized roller as defined in claim 1,
having a hollow part where no member exists in a part in an axial direction in the roller body.

8. The motorized roller as defined in claim 1,
wherein the motor has a central axis and the inner periphery of the fixed shaft extends around the central axis of the motor.

9. A motorized roller comprising:
a roller body having both ends;
a plurality of fixed shafts with one of the fixed shafts protruding out of each of the both ends of the roller body; and
a motor housed in the roller body,
wherein rotation of the motor rotates the roller body around the fixed shafts,
at least one of the fixed shafts having a cavity and having a first connector at an inside or a distal end of the fixed shaft so as to electrically conduct between inside and outside of the roller body by connection of a separately prepared second connector to the first connector, one selected from the fixed shaft and the first connector having a first engaging part for preventing disengagement of the second connector, so that a part of the second connector is mechanically engaged with the first engaging part,
including the second connector,
the first connector being arranged within the fixed shaft,
the first engaging part being formed on an inner surface of the fixed shaft,
the second connector having a second engaging part at an outer periphery of the second connector,
so that the second connector is attached to the fixed shaft by engagement of the first engaging part with the second engaging part,
the second engaging part being an elastic nail, and
the first engaging part being a projection to be engaged with the nail.

10. A motorized roller comprising:
a roller body having both ends;
a plurality of fixed shafts with one of the fixed shafts protruding out of each of the both ends of the roller body; and
a motor housed in the roller body,
wherein rotation of the motor rotates the roller body around the fixed shafts,
at least one of the fixed shafts having a cavity and having a first connector at an inside or a distal end of the fixed shaft so as to electrically conduct between inside and outside of the roller body by connection of a separately prepared second connector to the first connector,
one selected from the fixed shaft and the first connector having a first engaging part for preventing disengagement of the second connector, so that a part of the second connector is mechanically engaged with the first engaging part,
including the second connector,
the first connector being arranged within the fixed shaft,
the first engaging part being formed on an inner surface of the fixed shaft,
the second connector having a second engaging part at an outer periphery of the second connector,
so that the second connector is attached to the fixed shaft by engagement of the first engaging part with the second engaging part,
the second connector having a main body and an engaging tube formed around the main body,
so that the engaging tube of the second connector is engaged with an outer periphery of the first connector.

11. A motorized roller, comprising:
a roller body of a hollow tubular shape and having both ends;
a motor unit housed in the roller body;
a pair of lids closing the both ends of the roller body; and
a shaft supporting member being positioned in the roller body;
wherein the motor unit comprises: a cylindrical casing being housed in the roller body; a motor housed in the casing; a first shaft protruding out of a distal end of the casing and having a free end; a first holder fixing a proximal end portion of the first shaft to a distal end portion of the casing; and a driving shaft protruding out of a proximal end of the casing, so that a rotational force of the motor is transmitted to the driving shaft,
the first shaft being hollow, protruding out of the distal end of the casing with being held by the first holder, and having a first connector at an inside or a distal end of the first shaft,
one selected from the first connector and the inside of the first shaft having a first engaging part in a form of a projection,
wherein the motorized roller further has a second shaft, a second connector, and a second engaging part at an outer periphery of the second connector, the second engaging part being of an elastic nail shape,
the first shaft having a portion adjacent to the free end and protruding out of a distal end of the roller body,
the portion of the first shaft being supported by the lids rotatably relative to the roller body,
the driving shaft being positioned in the roller body, held on a central axis of the roller body by the shaft supporting member, and united integrally with the roller body about rotation via the shaft supporting member, and
the second shaft being mounted rotatively to the roller body on the proximal end of the roller body,
so as to electrically conduct between inside and outside of the roller body by connection of the second connector to the first connector and further to mechanically engage the second engaging part with the first engaging part.

12. A motor unit for a motorized roller, being inserted into a roller body so as to constitute a motorized roller,
wherein the motor unit comprises: a cylindrical casing; a motor housed in the casing; a first shaft protruding out of a distal end of the casing; a first holder fixing a proximal end portion of the first shaft to a distal end portion of the casing; and a driving shaft protruding out of a proximal end of the casing, so that a rotational force of the motor is transmitted to the driving shaft,
the first shaft being hollow, protruding out of the distal end of the casing with being held by the first holder, and having a first connector at an inside or a distal end of the first shaft, so as to electrically conduct between inside and outside of the roller body by connection of a separately prepared second connector to the first connector, and
the fixed shaft is hollow and has an inner periphery and a first engaging part for preventing disengagement of the second connector, so that a part of the second connector is mechanically engaged with the first engaging part,
including the second connector, the first connector being arranged within the first shaft, the first engaging part being formed on the inner periphery of the first shaft, and the second connector having a second engaging part at an outer periphery of the second connector, so that the second connector is attached to the first shaft by engagement of the first engaging part with the second engaging part.

13. The motor unit as defined in claim 12,
the motor having a stator and a rotor, the stator being fixed to an inner surface of the casing with the rotor held rotatively in the stator so that a rotational force of the rotor is transmitted to the driving shaft.

14. The motor unit as defined in claim 12,
the first engaging part being formed on an inner wall of the cavity of the first shaft.

15. The motor unit as defined in claim 12,
having a sleeve between an outer periphery of the first connector and an inner wall of the cavity of the first shaft.

16. The motor unit as defined in claim 12,
the second engaging part being a male screw, and
the first engaging part being a female screw.

17. The motor unit as defined in claim 12,
the motor having a plurality of coils, and
the roller body housing at least a part of a circuit for supplying current to the coils.

18. The motor unit as defined in claim 12,
wherein the motor has a central axis and the inner periphery of the fixed shaft extends around the central axis of the motor.

19. A motor unit for a motorized roller, being inserted into a roller body so as to constitute a motorized roller,
wherein the motor unit comprises: a cylindrical casing; a motor housed in the casing; a first shaft protruding out of a distal end of the casing; a first holder fixing a proximal end portion of the first shaft to a distal end portion of the casing; and a driving shaft protruding out of a proximal end of the casing, so that a rotational force of the motor is transmitted to the driving shaft,
the first shaft being hollow, protruding out of the distal end of the casing with being held by the first holder, and having a first connector at an inside or a distal end of the first shaft, so as to electrically conduct between inside and outside of the roller body by connection of a separately prepared second connector to the first connector,
one selected from the fixed shaft and the first connector having a first engaging part for preventing disengagement of the second connector, so that a part of the second connector is mechanically engaged with the first engaging part,
including the second connector, the first connector being arranged within the first shaft, the first engaging part being formed on an inner surface of the first shaft, and the second connector having a second engaging part at an outer periphery of the second connector, so that the second connector is attached to the first shaft by engagement of the first engaging part with the second engaging part,
the second engaging part being an elastic nail, and
the first engaging part being a projection to be engaged with the nail.

20. A motor unit for a motorized roller, being inserted into a roller body so as to constitute a motorized roller,
wherein the motor unit comprises: a cylindrical casing; a motor housed in the casing; a first shaft protruding out of a distal end of the casing; a first holder fixing a proximal end portion of the first shaft to a distal end portion of the casing; and a driving shaft protruding out of a proximal end of the casing, so that a rotational force of the motor is transmitted to the driving shaft,
the first shaft being hollow, protruding out of the distal end of the casing with being held by the first holder, and having a first connector at an inside or a distal end of the first shaft, so as to electrically conduct between inside and outside of the roller body by connection of a separately prepared second connector to the first connector,
one selected from the fixed shaft and the first connector having a first engaging part for preventing disengagement of the second connector, so that a part of the second connector is mechanically engaged with the first engaging part,
including the second connector, the first connector being arranged within the first shaft, the first engaging part being formed on an inner surface of the first shaft, and the second connector having a second engaging part at an outer periphery of the second connector, so that the second connector is attached to the first shaft by engagement of the first engaging part with the second engaging part,
the second connector having a main body and an engaging tube formed around the main body, so that the engaging tube of the second connector is engaged with an outer periphery of the first connector.

* * * * *